United States Patent [19]

Mott

[11] 4,087,684

[45] May 2, 1978

[54] FIBER OPTICS PROPORTIONAL CONTROL SYSTEM

[75] Inventor: Richard C. Mott, Harwood Heights, Ill.

[73] Assignee: Honeywell Inc., Minneapolis, Minn.

[21] Appl. No.: 764,260

[22] Filed: Jan. 31, 1977

Related U.S. Application Data

[63] Continuation of Ser. No. 649,172, Jan. 14, 1976, abandoned.

[51] Int. Cl.² ............... G01D 5/34; G02B 5/14; H01J 5/16
[52] U.S. Cl. ................................. 250/231 R; 250/227
[58] Field of Search ............ 250/231, 230, 227; 350/96 C; 73/15 R; 324/96, 97, 110

[56] References Cited

U.S. PATENT DOCUMENTS

| | | | |
|---|---|---|---|
| 2,199,071 | 4/1940 | Gale | 250/231 R |
| 2,954,479 | 9/1960 | Cibelius, Jr. | 250/231 R |
| 3,495,777 | 2/1970 | Evalds et al. | 250/231 R |
| 3,693,022 | 9/1972 | Dumasy et al. | 250/231 R |
| 3,779,628 | 12/1973 | Kapron et al. | 350/96 C |
| 3,788,795 | 1/1974 | Zeitlin | 250/231 R |
| 3,931,514 | 1/1976 | Patterson | 250/231 R |

OTHER PUBLICATIONS

Elijah, "Temperature Sensing", IBM Technical Bulletin, vol. 13, No. 3, Aug. 1970, p. 758.

Primary Examiner—Alfred E. Smith
Assistant Examiner—David K. Moore
Attorney, Agent, or Firm—Trevor B. Joike

[57] ABSTRACT

A fiber optic feedback control system for controlling a motor having an output for driving a condition controlling device, is disclosed which comprises a fiber optic having a first flared end, a light source for supplying light to the first flared end, a shadow mask between the light source and the first flared end having a position dependent upon the output of the motor, a second flared end for supplying light to a pair of photocells under the control of a condition responsive element and means for connecting the photocells to the motor whereby, upon movement of the condition responsive device, one of the photocells receives light from the second flared end of the fiber optic to energize the motor in a specific direction which repositions the shadow mask between the light source and the first flared end to block out light supplied to the photocells, the resulting position of the output of the motor being proportional to the movement of the condition responsive element.

13 Claims, 4 Drawing Figures

FIBER OPTICS PROPORTIONAL CONTROL SYSTEM

BACKGROUND OF THE INVENTION

This is a continuation of application Ser. No. 649,172, filed Jan. 14, 1976 and now abandoned.

In the control of various conditions, such as temperature, various control systems have been arranged. For example, temperature controlling valves driven by a motor controlled by a thermostat have been employed to control the temperature of a space. These systems, however, were on-off systems in the sense that the motors either drove the valves fully opened or fully closed. In such systems, the condition or temperature responsive device operated between an off position and an on position. The distance between these off and on positions is termed the "differential" of the control system. Because these on-off systems operated within a differential, the actual temperature of the controlled environment tended to oscillate around the control or set point. To eliminate this cycling, the prior art developed the proportional control system.

To make the prior art motor driven or actuator driven on-off systems proportional, a rebalancing resistor, connected into a bridge circuit with the condition responsive device and operated by the motor or actuating means, was used. Thus, when the condition responsive means sensed a change in condition away from a control point, the motor or actuator would move a control element such as a valve a distance until the balancing resistor balanced the condition responsive means. This distance is then proportional to the output of the condition responsive means. These prior art proportional systems, however, tend to be complicated and expensive.

SUMMARY OF THE INVENTION

The present invention uses a fiber optic having first and second flared ends to provide the feedback function. A bi-directional motor drives an output for positioning a condition controlling device such as a valve. Connected to and movable with the output driven by the bi-directional motor is a shadow mask positionable between a source of light and the first flared end of the fiber optic. The light from the source is transmitted by the fiber optic to the second flared end for supplying light to two photocells under the control of a condition responsive element such as a temperature responsive bi-metal. The photocells are connected to control the direction of energization of the bi-directional motor. Under quiescent conditions, the shadow mask at the first flared end creates a shadow at the second flared end of the fiber optic and both photocells are positioned within this shadow. The motor is thus de-energized and the load, which may be a valve, is held at a quiescent condition. If the temperature which is sensed by the bi-metal changes, the photocell arrangement is exposed to the light from the second flared end of the fiber optic. The energization of this photocell arrangement results in the energization of the motor to reposition the output element which controls the valve and reposition the shadow mask along the first flared end of the fiber optics which repositions the shadow at the second flared end. When the shadow mask at the first flared end has moved sufficiently to darken both of the photocells, the motor is de-energized and the amount of movement of the output of the bi-directional motor is proportional to the movement of the temperature responsive bi-metal. Thus, the system is proportional in nature.

This arrangement results in a low cost electric proportioning control system particularly useful in individual room temperature control. By using oriented optics and by flaring or fanning out the fiber optics at both ends, either a multiplication or reduction in motion of the motor can be achieved. This arrangement can be used to preselect the ratio of motor output movement to thermostat movement.

BRIEF DESCRIPTION OF THE DRAWINGS

These and other features and advantages will become apparent from a detailed review of the drawings in which.

DETAILED DESCRIPTION OF THE INVENTION

Figure 1:
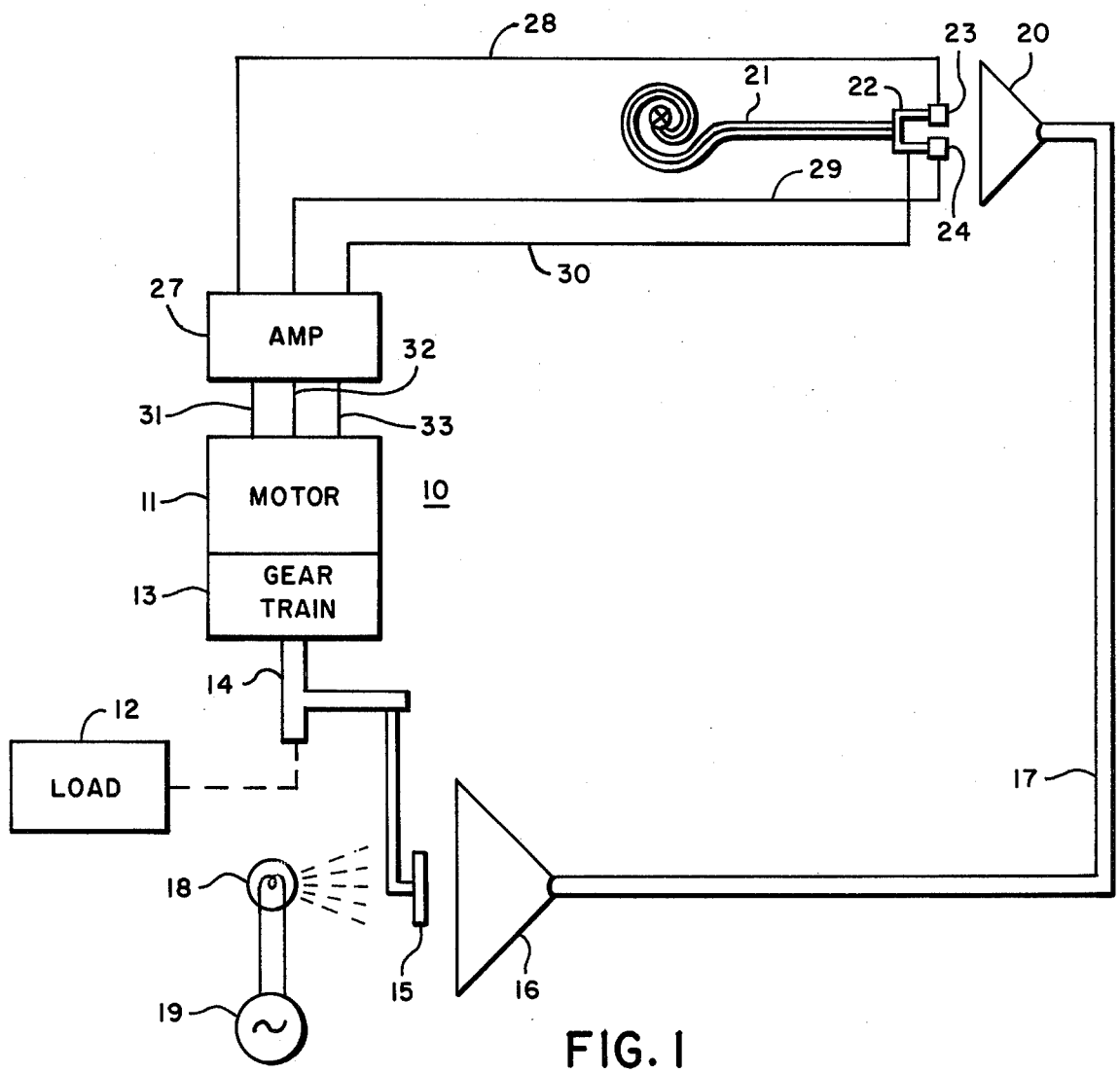
FIG. 1 is a schematic diagram of the fiber optics feedback arrangement.

The control system 10 in FIG. 1 includes a bi-directional motor 11 for driving a load 12 through a gear train 13 and an output shaft 14. Connected to the output shaft 14 is a shadow mask 15 positionable along a first flared end 16 of a fiber optic 17. A source of light 18 driven by a power supply 19 exposes the flared end 16 to the light emitted by source 18 which is conducted over the fiber optic 17 to the second flared end 20.

A condition responsive device, which may be a temperature responsive bi-metal 21, has mounted, by suitable means 22, on its end photocells 23 and 24 which are responsive to the light emitted by flared end 20. Photocell 23 is connected to an amplifier 27 over line 28 and photocell 24 is connected to amplifier 27 over line 29. The element 22, which acts as a common junction to both photocells 23 and 24, is connected to the amplifier over line 30. The output from the amplifier is supplied over the conductors 31, 32, and 33 to the bi-directional motor.

Figure 3:
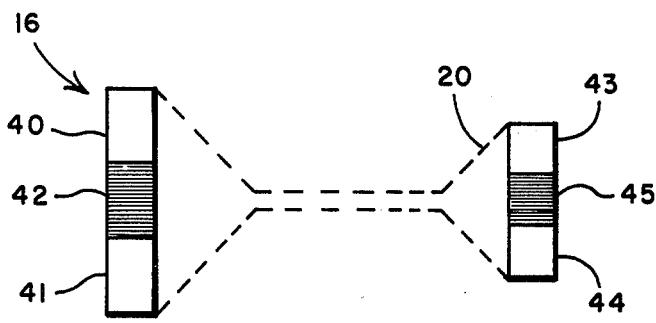
FIG. 3 shows the shadow across the two flared ends of the fiber optic.

As shown in FIG. 3, the flared end 16 has lighted sections 40 and 41 separated by a shadow 42 created by the shadow mask 15. The light impinging upon lighted section 40 is transmitted from the first end 16 over fibers of the fiber optic to flared end 20 to create a lighted section 43. Similarly, the light impinging upon lighted section 41 of flared end 16 is transferred over fibers of the fiber optic to the second flared end 20 to create a second lighted section 44 thereat. The shadow 45 at the second flared end 20 corresponds to the shadow 42 at flared end 16.

Under quiescent conditions, the photocells 23 and 24 are positioned within the shadow section 45 of the flared end 20. Thus, the motor 11 remains de-energized and the load 12 remains stationary. Upon change of the condition, such as temperature, sensed by the sensing element 21, one of the photocells 23 and 24 is moved into a corresponding lighted section 43 or 44 of the flared end 20. This results in energization of that photocell which produces an output from the amplifier 27 to the motor 11 to begin repositioning the load 12 in a direction determined by which one of the photocells has been energized. Upon movement of the output shaft 14, the shadow mask 15 also is repositioned thus changing the shadows 42 and 45 of the fiber optic 17. The shadow 45 is moved in a direction which has been determined by which one of the photocells 23 and 24 was moved into the light and the shadow 45 is moved by an amount necessary to darken both photocells 23 and 24. The amount necessary for the shadow mask 15 to move to darken out both photocells 23 and 24 is determined initially by the amount of movement of the bi-metal 21. Thus, the load 12 is moved by an amount proportional to the initial movement of the bi-metal 21. In this manner, the condition controlling device or load 12 is energized by an amount which is proportional to the change of condition sensed by the condition responsive device 21.

Figure 2:
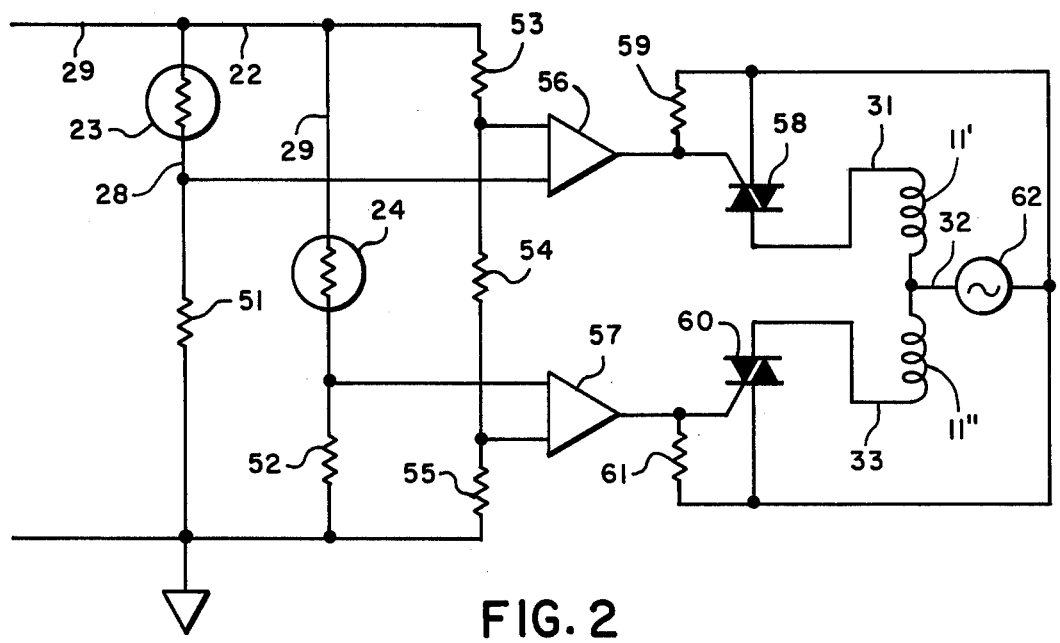
FIG. 2 is a schematic diagram of the amplifier shown in FIG. 1.

The control circuit of FIG. 2 is one form which the amplifier 27 may take. A positive source is connected over line 29 to the common junction 22 which is connected through photocell 23 and resistor 51 to ground and is also connected through photocell 24 and resistor 52 to ground. In addition, a voltage divider comprising resistors 53, 54 and 55 is connected between the positive source and ground. Amplifier 56 has one input connected to the junction of photocell 23 and resistor 51 and a second input connected to the junction of resistors 53 and 54. Amplifier 57 has a first input connected to the junction of photocell 24 and resistor 52 and a second input connected to the junction of resistors 54 and 55. The output of amplifier 56 is connected to the gate of triac 58, having a gating resistor 59, the cathode and anode of which are connected to control current flow from source 62 to motor winding 11' through lines 31 and 32. The output of amplifier 57 is connected to the gate of triac 60, having a gating resistor 61, the cathode and anode of which are connected to control current flow from source 62 to motor winding 11' through lines 32 and 33.

When photocell 23 is lighted, triac 58 is gated to energize motor winding 11' to open temperature controlling valve 12 and raise shadow mask 15. Shadow 45 is raised to darken photocell 23 to de-energize motor 11. When photocell 24 is lighted, triac 60 is gated to energize motor winding 11' to close temperature controlling valve 12 and lower shadow mask 15. Shadow 45 is lowered to darken photocell 24 to de-energize motor 11.

Figure 4:
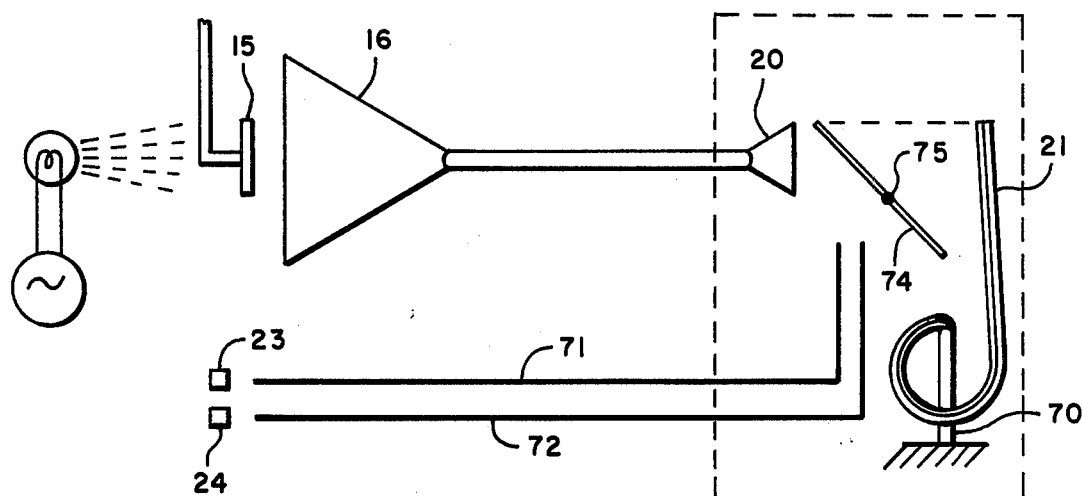
FIG. 4 shows another form of the system shown in FIG. 1.

The arrangement shown in FIG. 4 presents an alternative to the arrangement shown in FIG. 1. In FIG. 4, instead of mounting photocells 23 and 24 directly on bimetal 21, a mirror 74 is rotated according to the temperature sensed by bi-metal 21. Under quiescent conditions, the shadow 45 at flared end 20 is reflected by mirror 74 to fiber optics 71 and 72 which are connected to supply light to photocells 23 and 24. However, since both fiber optics 71 and 72 are in the shadow, both photocells 23 and 24 are dark. Upon a change in temperature sensed by bi-metal 21, mirror 74 is rotated about pivot 75 to expose one of the fiber optics 71 and 72 to light to energize a corresponding one of the photocells 23 and 24.

As can be seen, the bi-metal 21 in FIG. 1 can control a shadow mask between a source of light and end 20 and output element 14 can drive a photocell arrangement and these and other modifications and changes can be made without departing from the scope of the invention which is to be limited only by the appended claims.

The embodiments of the invention in which an exclusive property or right is claimed are defined as follows:

1. A proportional closed loop control system for moving a movable output a distance proportional to a sensed condition comprising:
   actuating means having a movable output for changing the position of a condition controlling device;
   an element movable in response to a condition;
   light source means having a shutter attached to said movable output;
   light responsive means attached to said element, said light responsive means responsive to light from said light source means to provide an output;
   connecting means connecting said light responsive means to said actuating means for operating said actuating means in response to said output from said light responsive means; and,
   optical feedback means for transmitting light from said light source means to said light responsive means, said optical feedback means controlling the distance of movement of said movable output so that said distance is proportional to said output from said light responsive means.

2. A proportional closed loop control system for moving a movable output a distance proportional to a sensed condition comprising:
   actuating means having a movable output adapted to change the position of a condition controlling device;
   an element movable in response to a condition;
   light source means attached to one of said movable output and said element;
   light responsive means attached to the other of said movable output and said element, said light responsive means responsive to light from said light source means to provide an output;
   connecting means connecting said light responsive means to said actuating means for operating said actuating means in accordance with said output from said light responsive means; and,
   optical feedback means for transmitting light from said light source means to said light responsive means, said optical feedback means controlling the distance of movement of said movable output so that said distance is proportional to said output from said light responsive means.

3. The system of claim 2 wherein said light source means is attached to said movable output and said light responsive means is attached to said element.

4. The system of claim 3 wherein said light source means comprises a source of light, and a shadow mask attached to said movable output.

5. The system of claim 4 wherein said optical feedback means comprises a fiber optic extending from said light source means to said light responsive means.

6. The system of claim 5 wherein said light responsive means comprises a pair of photocells attached to said element.

7. The system of claim 6 wherein fiber optic comprises a first flared end for receiving light from said source of light and a shadow from said shadow mask, said shadow mask positioned between said source of light and said first flared end, and a second flared end, said fiber optic conducting said light and said shadow to said photocells whereby said photocells produce said output when one of them is in said light but do not produce said output when both photocells are in said shadow.

8. The system of claim 7 wherein said element comprises a temperature responsive bimetal.

9. The system of claim 2 wherein said optical feedback means comprises a fiber optic having a first end for receiving light from said light source means and for transmitting said light to said light responsive means at a second end of said fiber optic.

10. The system of claim 9 wherein said first end and said second end are flared.

11. The system of claim 10 wherein said light source means comprises a source of light, and a shadow mask attached to one of said movable output and said element, said shadow mask positioned between said source of light and said first end of said fiber optic for creating a shadow on said first end of said fiber optic, said fiber optic conducting said light and said shadow to said light responsive means, wherein said light responsive means provides said output when said light responsive means is not in said shadow and does not provide said output when said light responsive means is in said shadow.

12. The system of claim 11 wherein said light responsive means comprises a pair of photocells attached to the other of said movable output and said element.

13. The system of claim 12 wherein said element comprises a temperature responsive bimetal.

* * * * *